United States Patent
Rickis

(10) Patent No.: US 8,950,420 B2
(45) Date of Patent: Feb. 10, 2015

(54) CONTAINMENT HOUSING FOR A FUEL CONTROL HOUSING

(75) Inventor: Aaron Rickis, Feeding Hills, MA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 460 days.

(21) Appl. No.: 13/456,479

(22) Filed: Apr. 26, 2012

(65) Prior Publication Data

US 2013/0284283 A1  Oct. 31, 2013

(51) Int. Cl.
*F16K 11/07* (2006.01)

(52) U.S. Cl.
USPC ............... 137/15.21; 137/625.3; 137/625.38; 251/206; 251/210; 251/211; 251/366; 60/39.281

(58) Field of Classification Search
CPC ......... F16K 11/07; F16K 27/00; F02C 7/232; F02C 9/00; F02C 9/263; G05D 7/0635
USPC ........................ 251/205–206, 210–211, 366; 137/15.21, 625.3, 625.38; 60/39.281, 60/737, 740, 742
See application file for complete search history.

(56) References Cited

U.S. PATENT DOCUMENTS

| | | | |
|---|---|---|---|
| 1,318,521 A * | 10/1919 | Wolff | 137/533.13 |
| 4,215,723 A | 8/1980 | Ichiryu et al. | |
| 4,570,658 A * | 2/1986 | Dean et al. | 137/68.13 |
| 4,637,420 A | 1/1987 | Dyer | |
| 5,070,898 A | 12/1991 | Jagodzinski et al. | |
| 5,341,843 A * | 8/1994 | Rafeld | 137/343 |
| 6,401,446 B1 | 6/2002 | Gibbons | |
| 6,523,568 B1 * | 2/2003 | Trantham | 137/599.16 |
| 6,666,015 B2 | 12/2003 | Dyer | |
| 6,766,637 B2 * | 7/2004 | Wieger et al. | 60/39.281 |
| 2003/0155018 A1 * | 8/2003 | Kline | 137/606 |
| 2004/0025492 A1 | 2/2004 | Griffiths et al. | |
| 2008/0296403 A1 | 12/2008 | Futa, Jr. et al. | |
| 2011/0023982 A1 | 2/2011 | Griffiths | |
| 2011/0073201 A1 * | 3/2011 | Matsui et al. | 137/561 R |
| 2012/0180874 A1 * | 7/2012 | Mellette | 137/3 |
| 2013/0199469 A1 * | 8/2013 | Busse et al. | 123/90.15 |
| 2014/0075950 A1 * | 3/2014 | Podgorski et al. | 60/741 |

OTHER PUBLICATIONS

Ni, et al., Compensation Force CFD Analysis of Pressure Regulating Valve Applied in FMU of Engine and System Controls, 2011-01-2641, Copyright 2011 SAE International, 7 pages.
Anderson, et al., Mathematical Modelin of a Two Spool Flow Control Servolvalue Using a Pressure Control Pilot, Transactions of the ASME, Copyright 2002 by ASME, vol. 124, Sep. 2002, pp. 420-427.

* cited by examiner

*Primary Examiner* — Marina Tietjen
(74) *Attorney, Agent, or Firm* — Cantor Colburn LLP

(57) ABSTRACT

A containment housing includes a hexagonal portion configured to receive a linear variable differential transformer. The containment housing also includes a housing contact flange adjacent to the hexagonal portion. The housing contact flange has a flange face. The containment housing further includes an external threaded portion formed between the flange face and a containment housing end. The external threaded portion is configured to engage a fuel control housing portion of a fuel control. A length is defined between the flange face and the containment housing end, and a ratio of the length to a width of the housing contact flange is between 8.22 and 8.94.

20 Claims, 4 Drawing Sheets

CONTAINMENT HOUSING FOR A FUEL CONTROL HOUSING

BACKGROUND OF THE INVENTION

The present invention is related to fuel flow control, and more specifically to a containment housing for a fuel control housing.

Fuel flow control in systems such as gas turbines includes controlling and maintaining pressures within a fuel control housing of a fuel control. To control and maintain pressures within the fuel control housing, often the fuel flow is increased and decreased as well as diverted via a combination of control valves. A displacement pump pressurizes fuel prior to its metering and subsequent delivery to an engine. The displacement pump is typically sized to ensure an excess flow capacity at all possible operating conditions. The output of the pump is delivered to a fuel metering valve which, in conjunction with a bypassing, pressure regulating valve (PRV), meters the rate of fuel burn flow to the engine. Proper control of a fuel system is based on the consistent operation of all valves within the fuel system. For actively controlled valves, accurate and consistent feedback is needed for consistent valve operation. Without consistent valve operation, the fuel system may become unpredictable.

BRIEF DESCRIPTION OF THE INVENTION

Exemplary embodiments include a containment housing including a hexagonal portion configured to receive a linear variable differential transformer. The containment housing also includes a housing contact flange adjacent to the hexagonal portion. The housing contact flange has a flange face. The containment housing further includes an external threaded portion formed between the flange face and a containment housing end. The external threaded portion is configured to engage a fuel control housing portion of a fuel control. A length is defined between the flange face and the containment housing end, and a ratio of the length to a width of the housing contact flange is between 8.22 and 8.94.

Additional exemplary embodiments include a fuel control including a metering valve section and a containment housing section. The metering valve section includes a metering valve assembly having a metering valve spool configured to move bi-directionally along a longitudinal axis of a metering valve sleeve. The containment housing section includes a containment housing and a linear variable differential transformer coupled to the metering valve spool. The containment housing includes a hexagonal portion with internal threads engaging the linear variable differential transformer. The containment housing also includes a housing contact flange adjacent to the hexagonal portion. The housing contact flange has a flange face. The containment housing further includes an external threaded portion formed between the flange face and a containment housing end. The external threaded portion is configured to engage a fuel control housing portion of a fuel control. A length is defined between the flange face and the containment housing end, and a ratio of the length to a width of the housing contact flange is between 8.22 and 8.94.

Further exemplary embodiments include a method of installing a containment housing in a containment housing section of a fuel control. The method includes rotating a hexagonal portion of the containment housing to engage external threads of an external threaded portion of the containment housing with a fuel control housing portion in the containment housing section of the fuel control. The method also includes establishing contact between a flange face of a housing contact flange of the containment housing and the fuel control housing portion of the fuel control. The external threaded portion is formed between the flange face and a containment housing end. A length is defined between the flange face and the containment housing end, and a ratio of the length to a width of the housing contact flange is between 8.22 and 8.94. The method further includes engaging a linear variable differential transformer with internal threads of the hexagonal portion.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 1:
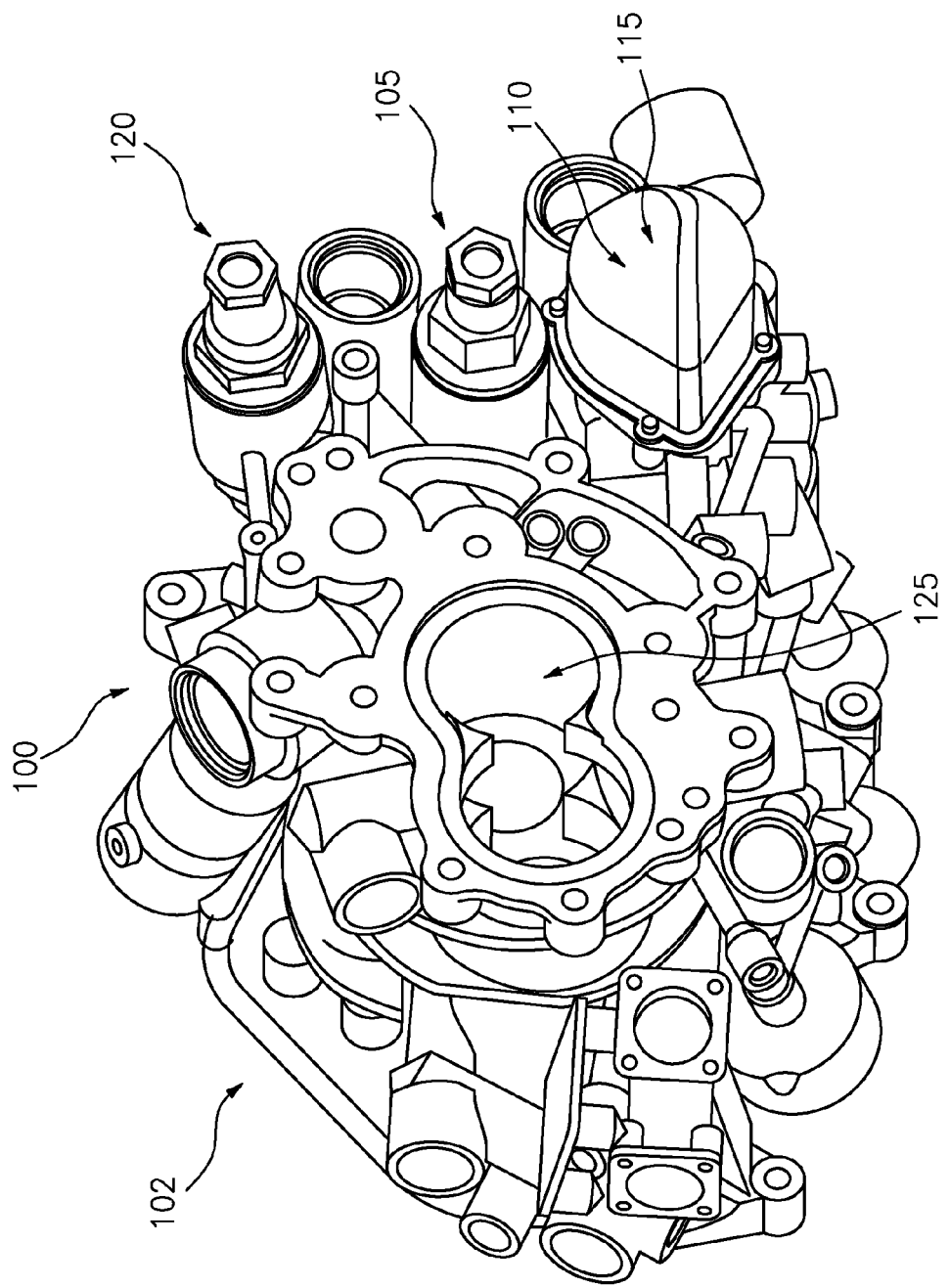
FIG. 1 schematically illustrates a perspective view of a fuel control housing portion for regulating fuel flow.

FIG. 1 schematically illustrates a perspective view of a fuel control housing portion 100 of a fuel control 102 for regulating fuel flow for systems such as aircraft gas turbine engines. In one embodiment, the fuel control housing portion 100 includes a pressure regulating valve section 105, a metering valve section 110, a containment housing section 115 that is generally adjacent to the metering valve section 110, and a servo minimum pressure valve section 120. Other valves, control and feedback features (not depicted) may also be included in the fuel control housing portion 100 or in another portion (not depicted) of the fuel control 102. Fuel flowing into the fuel control housing portion 100 is pressurized in a pump section 125. Pressurized flow is metered in metering valve section 110 before being output as a fuel burn flow at a metered pressure. The pressure regulating valve section 105 sets and controls the metered pressure of the metering valve section 110. The fuel control 102 can also provide fluid pressure for actuators (not depicted), where the servo minimum pressure valve section 120 establishes a minimum pressure and discharges excess flow to the pressure regulating valve section 105.

Figure 2:
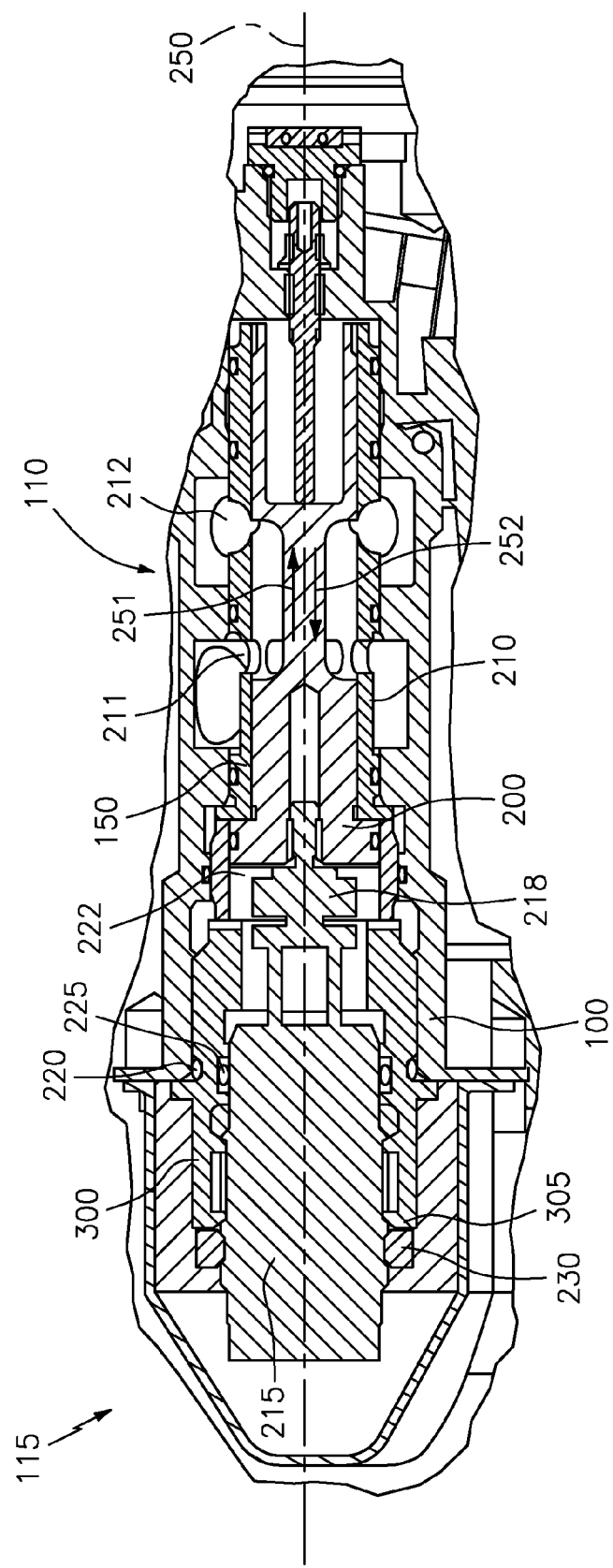
FIG. 2 schematically illustrates a cross-sectional view of a metering valve section and a containment housing section of the fuel control housing portion of FIG. 1.

FIG. 2 schematically illustrates a cross-sectional view of the metering valve section 110 and the containment housing section 115 of FIG. 1 including a metering valve assembly 150. The metering valve assembly 150 includes a metering valve spool 200 arranged within a metering valve sleeve 210. In one embodiment, the metering valve sleeve 210 includes an inlet window set 211 and an outlet window set 212. The metering valve spool 200 can move bi-directionally along longitudinal axis 250 as indicated by arrows 251, 252 to control the flow of a fluid, such as fuel, between the inlet window set 211 and outlet window set 212. The metering valve sleeve 210 remains fixed with respect to the metering valve section 110.

The containment housing section 115 includes a containment housing 300 configured to retain a linear variable differential transformer (LVDT) 215 in a fixed position. The LVDT 215 provides position feedback for position control of the metering valve spool 200. A translating member 218 extends from the LVDT 215 and couples to an end 222 of the metering valve spool 200 such that axial position and movement of the metering valve spool 200 can be detected by the LVDT 215. An external O-ring 220 may be installed between the containment housing 300 and the fuel control housing portion 100 to form a first seal. An internal O-ring 225 may be installed between the containment housing 300 and the LVDT 215 to form a second seal. Additional sealing members can also be included in the metering valve section 110 and the containment housing section 115. A retainer 230 may be positioned on the LVDT 215 and in contact with a mating face 305 of the containment housing 300.

Figure 3:
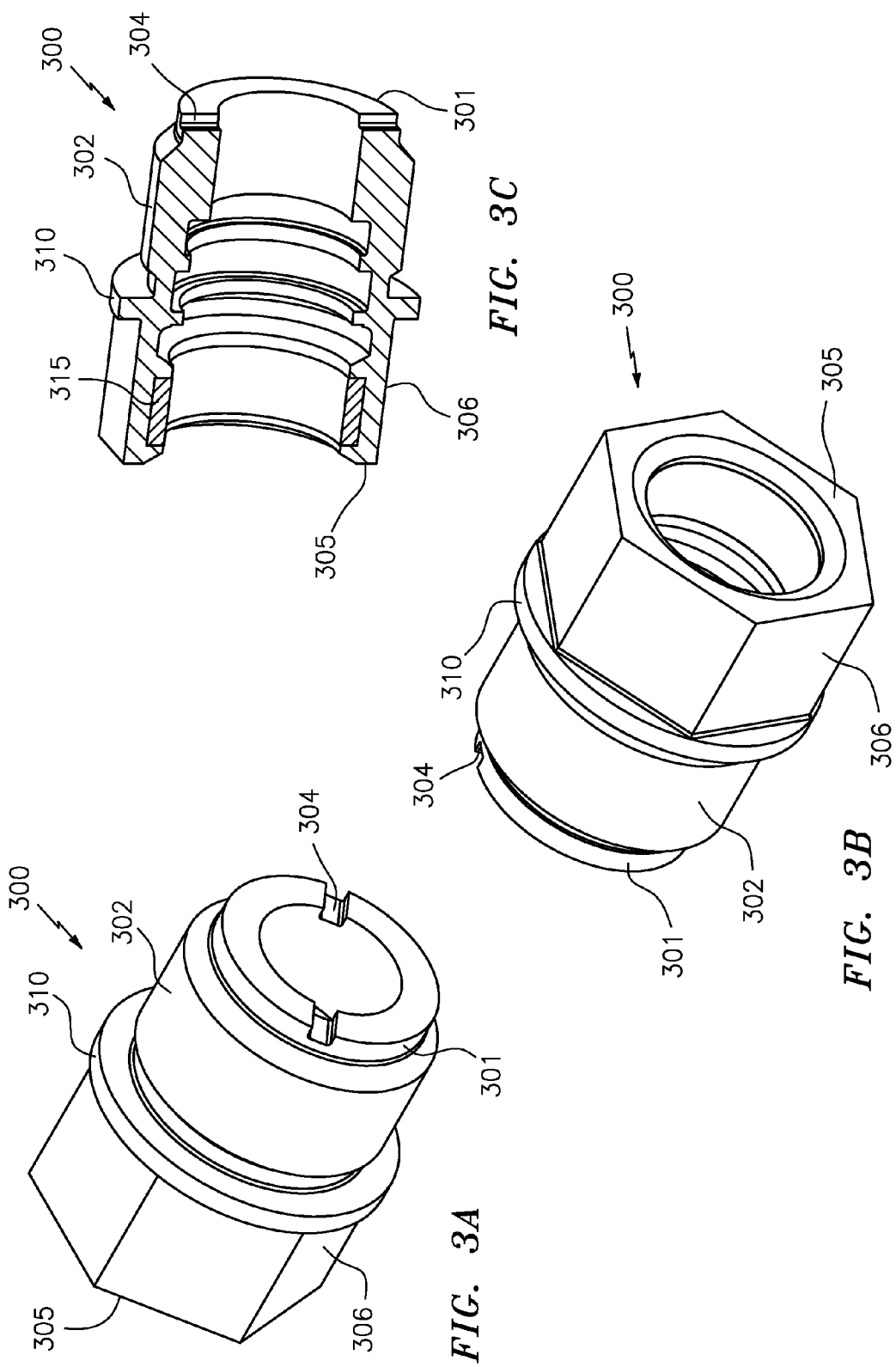
FIG. 3A to 3C illustrates several views of a containment housing of FIG. 2.

FIG. 3A to 3C illustrates several views of the containment housing 300 according to an embodiment. The containment housing 300 includes a containment housing end 301 that is configured to be affixed within the containment housing section 115 of the fuel control housing portion 100 of FIG. 1 via an external threaded portion 302. The external threaded portion 302 is formed between a housing contact flange 310 and the containment housing end 301. The containment housing end 301 also includes a pair of notches 304. The containment housing end 301 may act as a stop relative to movement of the metering valve spool 200 in the direction of arrow 252 of FIG. 2. The housing contact flange 310 is configured to contact the fuel control housing portion 100 of FIG. 1 when the containment housing 300 is installed in the containment housing section 115 of FIG. 1. The housing contact flange 310 is adjacent to a hexagonal portion 306, where the hexagonal portion 306 includes mating face 305.

The hexagonal portion 306 is configured to receive tooling to install the containment housing 300 in the containment housing section 115 of FIG. 1. Rotating the hexagonal portion 306 engages external threads of the external treaded portion 302 with the fuel control housing portion 100 in the containment housing section 115 of the fuel control 102 of FIG. 1. Internal to the hexagonal portion 306, the containment housing 300 also includes internal threads 315 configured to receive and engage the LVDT 215 of FIG. 2 and allow for adjustment. The internal threads 315 may be machined into the containment housing 300 or be an insert installed in the containment housing 300.

Figure 4:
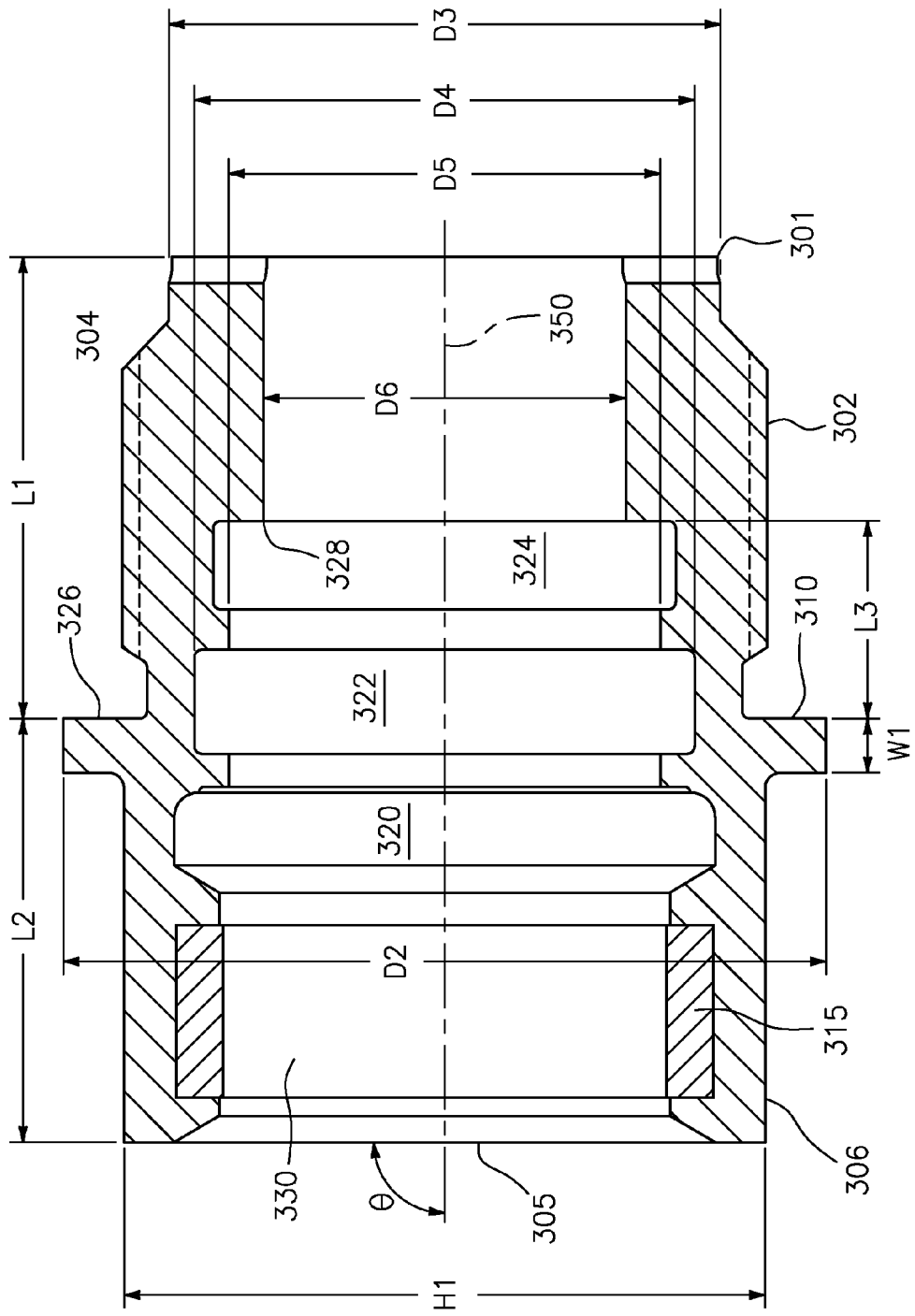
FIG. 4 schematically illustrates a cross-sectional view of the containment housing of FIG. 2.

FIG. 4 schematically illustrates a cross-sectional view of the containment housing 300 in greater detail according to an embodiment. The containment housing 300 has a height H1 of about 1.496 inches (3.80 cm) between parallel sides of the hexagonal portion 306. The housing contact flange 310 of the containment housing 300 has a diameter D2 of about 1.775 inches (4.51 cm). A ratio of diameter D2 to height H1 is between 1.17 and 1.20. The containment housing end 301 has a diameter D3 of about 1.28 inches (3.25 cm).

In an embodiment, the containment housing 300 also include annular cavities 320, 322, and 324. Annular cavity 320 may be provided for machining relief Annular cavity 322 may be provided to receive one or more sealing members, such as internal O-ring 225 of FIG. 2 and optionally one or more back-up rings for further leakage reduction. Annular cavity 322 has a diameter D4 of about 1.163 inches (2.95 cm). Annular cavity 324 may define an LVDT installation stop 328, where the LVDT installation stop 328 establishes a maximum installation depth for the LVDT 215 of FIG. 2. Annular cavity 324 has a diameter D5 of about 1.003 inches (2.55 cm). An inner diameter D6 of the containment housing end 301 is about 0.84 inches (2.13 cm). A ratio of diameter D4 to inner diameter D6 is between 1.37 and 1.40.

The housing contact flange 310 has a flange face 326 that contacts the fuel control housing portion 100 when the containment housing 300 is installed in the containment housing section 115 of FIG. 2. In an embodiment, a length L1 from the flange face 326 to the containment housing end 301 is about 1.071 inches (2.72 cm). A length L2 from the flange face 326 to mating face 305 is about 0.983 inches (2.50 cm). A ratio of length L1 to length L2 is between 1.08 and 1.10. A length L3 from the flange face 326 to the LVDT installation stop 328 is about 0.46 inches (1.17 cm). The housing contact flange 310 has a width W1 of about 0.125 inches (0.3175 cm). A ratio of diameter D2 to width W1 is between 13.6 and 14.8. A ratio of length L1 to width W1 is between 8.22 and 8.94. A ratio of length L2 to width W1 is between 7.52 and 8.23.

The containment housing 300 includes a containment housing bore 330. The LVDT 215 of FIG. 2 is installed into the containment housing bore 330 and placed in threaded engagement with internal threads 315. The containment housing bore 330 is substantially perpendicular to the mating face 305, such that a center line 350 of the containment housing bore 330 is within 0.001 inches (0.00254 cm) of perpendicular to the mating face 305. Tight control of the perpendicular relationship helps to ensure that minimal positional shifting occurs when the retainer 230 of FIG. 2 is positioned on the LVDT 215 and placed in contact with the mating face 305 of the containment housing 300. When installed, the center line 350 substantially aligns with the longitudinal axis 250 of FIG. 2.

A method of installing the containment housing 300 in the containment housing section 115 of fuel control 102 is described herein with reference to FIGS. 1-4. The method includes installing a first seal between the containment housing 300 and fuel control housing portion 100, such as external O-ring 220. A second seal is installed in the containment housing 300 to be positioned between the containment housing 300 and the LVDT 215, such as internal O-ring 225 in annular cavity 322. The hexagonal portion 306 of the containment housing 300 is rotated to engage external threads of external threaded portion 302 of the containment housing 300 with the fuel control housing portion 100 in the containment housing section 115 of the fuel control 102. Contact is established between flange face 326 of the housing contact flange 310 of the containment housing 300 and the fuel control housing portion 100 of the fuel control 102. The LVDT 215 is engaged with internal threads 315 of the hexagonal portion 306. The LVDT 215 is coupled to the metering valve spool 200. The retainer 230 is positioned on the LVDT 215 and in contact with the mating face 305.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while the various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A containment housing comprising:
 a hexagonal portion configured to receive a linear variable differential transformer;
 a housing contact flange adjacent to the hexagonal portion, the housing contact flange comprising a flange face; and an external threaded portion formed between the flange face and a containment housing end, the external threaded portion configured to engage a fuel control housing portion of a fuel control, wherein a first length is defined between the flange face and the containment housing end, and a ratio of the first length to a width of the housing contact flange is between 8.22 and 8.94.

2. The containment housing of claim 1, wherein the hexagonal portion comprises a mating face, a second length is defined between the mating face and the flange face, and a ratio of the second length to the width of the housing contact flange is between 7.52 and 8.23.

3. The containment housing of claim 2, further comprising a containment housing bore formed substantially perpendicular to the mating face.

4. The containment housing of claim 3, wherein a center line of the containment housing bore is within 0.001 inches (0.00254 cm) of perpendicular to the mating face.

5. The containment housing of claim 1, wherein a ratio of a diameter of the housing contact flange to the width of the housing contact flange is between 13.6 and 14.8.

6. The containment housing of claim 1, further comprising internal threads configured to engage the linear variable differential transformer.

7. The containment housing of claim 6, further comprising a linear variable differential transformer installation stop to establish a maximum installation depth of the linear variable differential transformer.

8. The containment housing of claim 1, further comprising an annular cavity configured to receive one or more sealing members, wherein a ratio of a diameter of the annular cavity to an inner diameter of the containment housing end is between 1.37 and 1.40.

9. A fuel control comprising:
a metering valve section comprising a metering valve assembly, the metering valve assembly comprising a metering valve spool configured to move bi-directionally along a longitudinal axis of a metering valve sleeve; and
a containment housing section comprising a containment housing and a linear variable differential transformer coupled to the metering valve spool, the containment housing comprising:
a hexagonal portion comprising internal threads engaging the linear variable differential transformer;
a housing contact flange adjacent to the hexagonal portion, the housing contact flange comprising a flange face; and
an external threaded portion formed between the flange face and a containment housing end, the external threaded portion configured to engage a fuel control housing portion of the fuel control, wherein a first length is defined between the flange face and the containment housing end, and a ratio of the first length to a width of the housing contact flange is between 8.22 and 8.94.

10. The fuel control of claim 9, wherein the hexagonal portion comprises a mating face, second length is defined between the mating face and the flange face, and a ratio of the second length to the width of the housing contact flange is between 7.52 and 8.23.

11. The fuel control of claim 10, further comprising a containment housing bore formed substantially perpendicular to the mating face.

12. The fuel control of claim 11, wherein a center line of the containment housing bore is within 0.001 inches (0.00254 cm) of perpendicular to the mating face.

13. The fuel control of claim 11, further comprising a retainer positioned on the linear variable differential transformer and in contact with the mating face.

14. The fuel control of claim 9, wherein a ratio of a diameter of the housing contact flange to the width of the housing contact flange is between 13.6 and 14.8.

15. The fuel control of claim 9, further comprising a linear variable differential transformer installation stop to establish a maximum installation depth of the linear variable differential transformer.

16. The fuel control of claim 9, further comprising an annular cavity configured to receive one or more sealing members, wherein a ratio of a diameter of the annular cavity to an inner diameter of the containment housing end is between 1.37 and 1.40.

17. The fuel control of claim 9, wherein the containment housing end is a stop relative to movement of the metering valve spool in one direction along the longitudinal axis.

18. A method of installing a containment housing in a containment housing section of a fuel control, the method comprising:
rotating a hexagonal portion of the containment housing to engage external threads of an external threaded portion of the containment housing with a fuel control housing portion in the containment housing section of the fuel control;
establishing contact between a flange face of a housing contact flange of the containment housing and the fuel control housing portion of the fuel control, wherein the external threaded portion is formed between the flange face and a containment housing end, a first length is defined between the flange face and the containment housing end, and a ratio of the first length to a width of the housing contact flange is between 8.22 and 8.94; and
engaging a linear variable differential transformer with internal threads of the hexagonal portion.

19. The method of claim 18, wherein the hexagonal portion comprises a mating face, a second length is defined between the mating face and the flange face, and a ratio of the second length to the width of the housing contact flange is between 7.52 and 8.23.

20. The method of claim 19, further comprising:
installing a first seal between the containment housing and the fuel control housing portion;
installing a second seal between the containment housing and the linear variable differential transformer;
coupling the linear variable differential transformer to a metering valve spool; and
positioning a retainer on the linear variable differential transformer and in contact with the mating face, wherein the linear variable differential transformer is installed in a containment housing bore formed substantially perpendicular to the mating face and a center line of the containment housing bore is within 0.001 inches (0.00254 cm) of perpendicular to the mating face.

* * * * *